Figure 3:
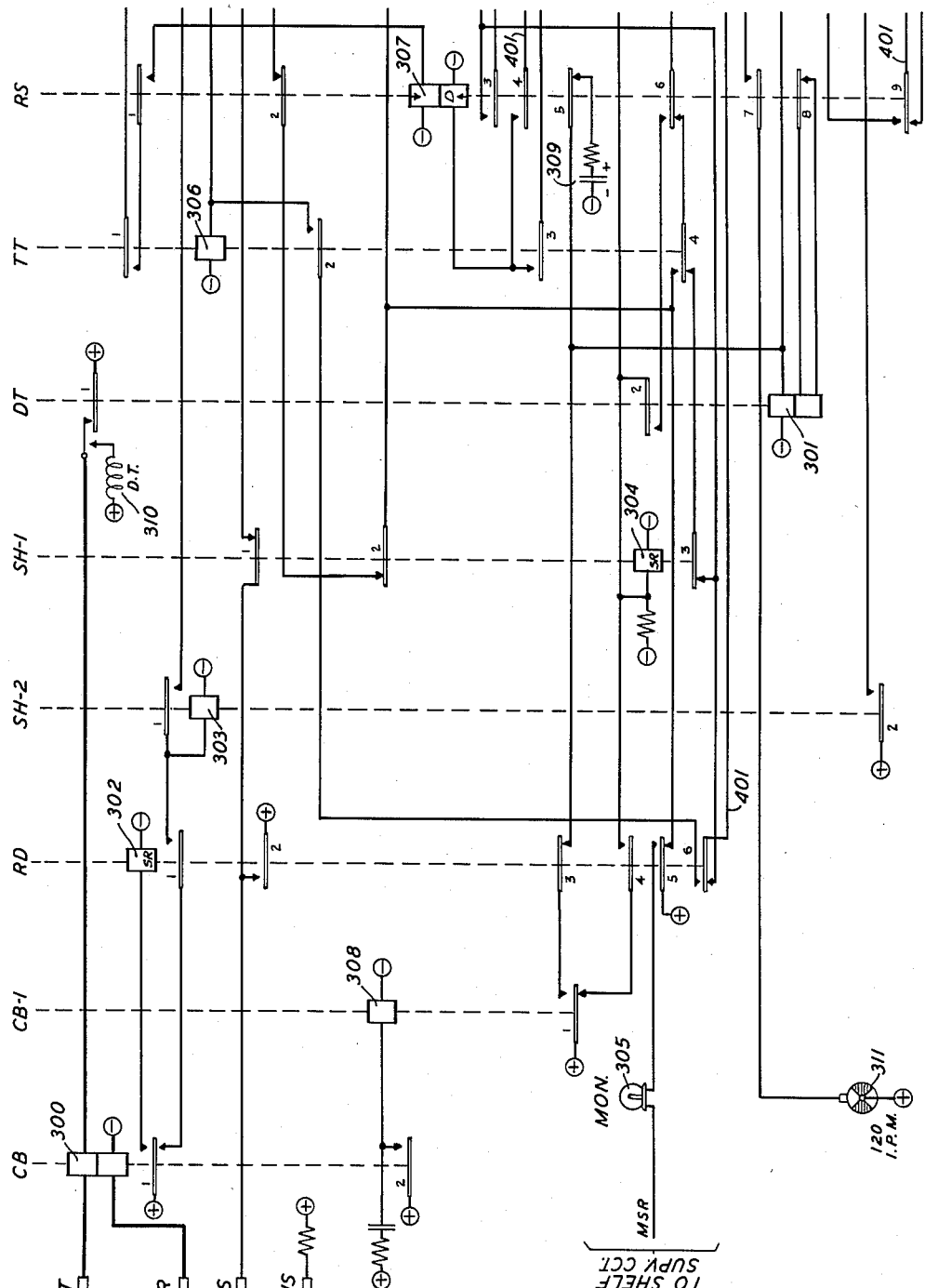

Jan. 24, 1956  E. H. GATZERT  2,732,441
TESTING MEANS IN A SIGNALING SYSTEM
Filed March 16, 1953  3 Sheets-Sheet 1
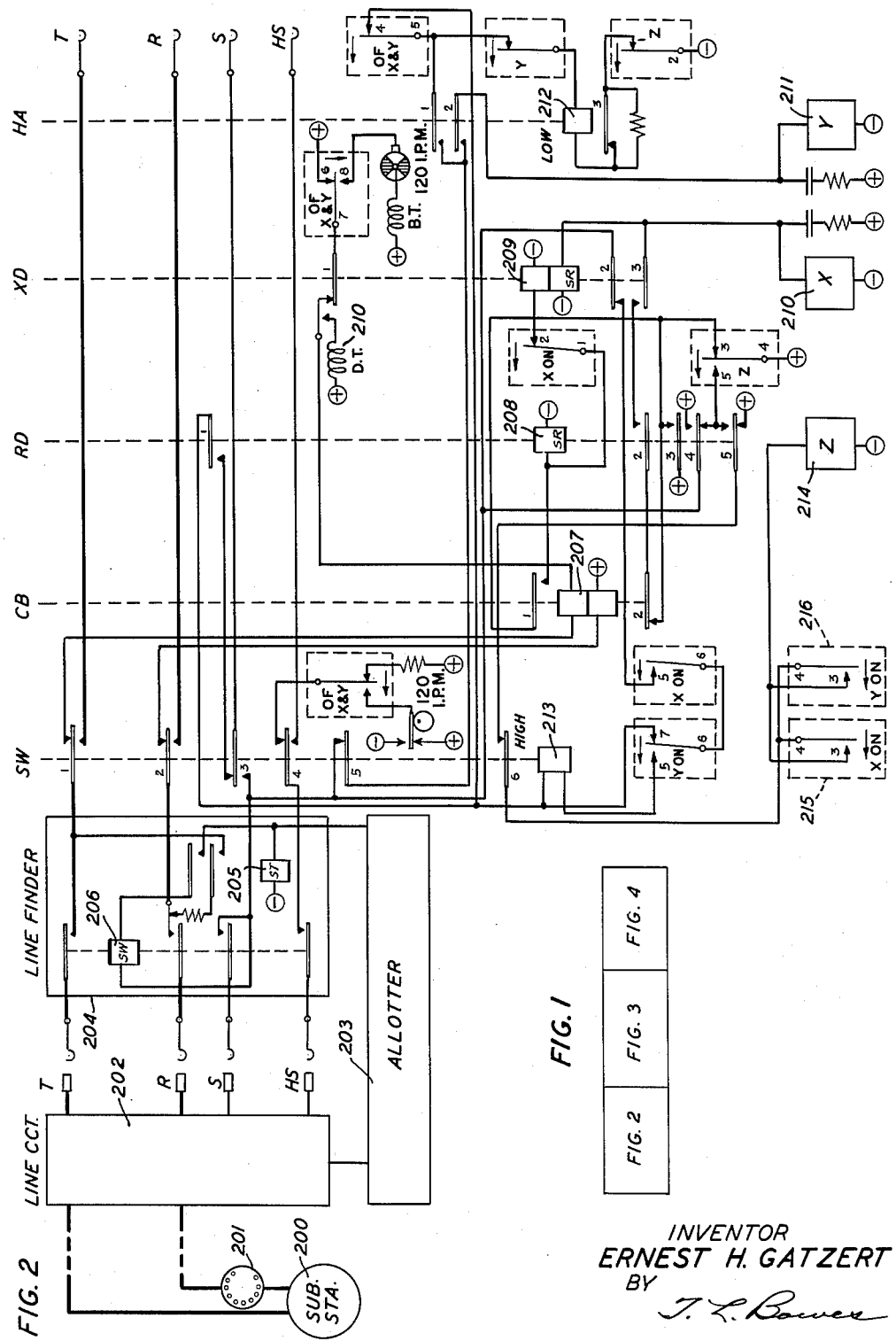
INVENTOR
ERNEST H. GATZERT
BY
ATTORNEY Jan. 24, 1956  E. H. GATZERT  2,732,441
TESTING MEANS IN A SIGNALING SYSTEM
Filed March 16, 1953  3 Sheets-Sheet 2

INVENTOR
ERNEST H. GATZERT
BY
J. L. Bowes
ATTORNEY

INVENTOR
ERNEST H. GATZERT
BY
J. L. Bowes
ATTORNEY

United States Patent Office 2,732,441
Patented Jan. 24, 1956

2,732,441

TESTING MEANS IN A SIGNALING SYSTEM

Ernest H. Gatzert, Rochester, N. Y., assignor, by mesne assignments, to General Dynamics Corporation, a corporation of Delaware Application March 16, 1953, Serial No. 342,345

5 Claims. (Cl. 179—175.2)

This invention relates to testing means and particularly to means for testing signal transmitters in telecommunication systems.

The object of the invention is to provide an accurate and economical means whereby a maintenance man on a visit to a station such as a telephone substation may quickly test the operation of a signal transmitter such as the conventional dial thereat.

The invention consists of a special circuit which the user of the station may reach by conventional use of the signal transmitter, which will respond to an operation thereof and which will return to the user a signal indicating the approximate operating characteristics thereof.

In a preferred embodiment of the invention, a test circuit is provided which may be reached by the conventional dial of a telephone substation and which, having been reached, will respond to another operation of the dial and thereupon transmit back to the substation a signal indicating that the dial is operating at a speed below normal, at approximately normal speed, or at a speed above normal.

A feature of the invention is a special circuit which is accessible over conventional selective switches and which has circuit means responsive to an additionally transmitted train of dial pulses. This circuit means has timing means which will observe the time characteristics of this additionally transmitted train of dial pulses and which will record temporarily the fact that the distant dial has operated slowly, properly, or too fast and which will then transmit a signal back to the dial substation reporting such fact.

A feature of the invention is a circuit which will measure the speed of operation of a telephone substation dial and which will thereupon automatically transmit back to the substation one of three types of tone signals indicating slow, normal, or fast operation of the dial. While the broad conception of the nature of these tone signals admits of a wide variety of equivalents, including different frequency tones, applicant has chosen to disclose in his preferred embodiment, a coded type of signal which manifests itself as one peep to indicate slow operation, two peeps to indicate normal operation, and three peeps to indicate fast operation of the dial.

Another feature of the invention resides in the use of two stepping switches both started simultaneously on the first pulse of a train of pulses transmitted thereto and both stopped at the ending of said train of pulses. One of said switches responds directly to the pulses of said train while the other operates automatically at a predetermined rate and thus measures the elapsed time. The point reached by this latter switch is an indication of the satisfactory or unsatisfactory operation of the device used to transmit the train of pulses.

Still another feature of the invention is a testing circuit which will respond to a train of pulses, determine the comparative speed of operation of a pulse transmitted, report back its findings, and prepare itself for further and repeated operations of the same nature whereby a first report may be confirmed one or more times.

Still another feature is a circuit arrangement of a means for testing pulse or signal transmitters which will respond only to a particular signal transmitted thereto. Specifically as disclosed herein, the testing circuit provided will respond to a train of ten pulses and will report its findings but will refuse to issue a report when a train of any other number of pulses is transmitted thereto.

Another feature of the invention is the provision of means for stopping further automatic operation of the time measuring switch when it reaches a point beyond which no change in its report can be made. More specifically stated, if the signal transmitter is extraordinarily slow in its operation, the time measuring switch might easily be driven beyond its actual range of operation so means is provided to stop further movement of this switch as soon as it reaches the point where it can make the report that the signal transmitter is slow.

Other features will appear hereinafter.

Figure 4:
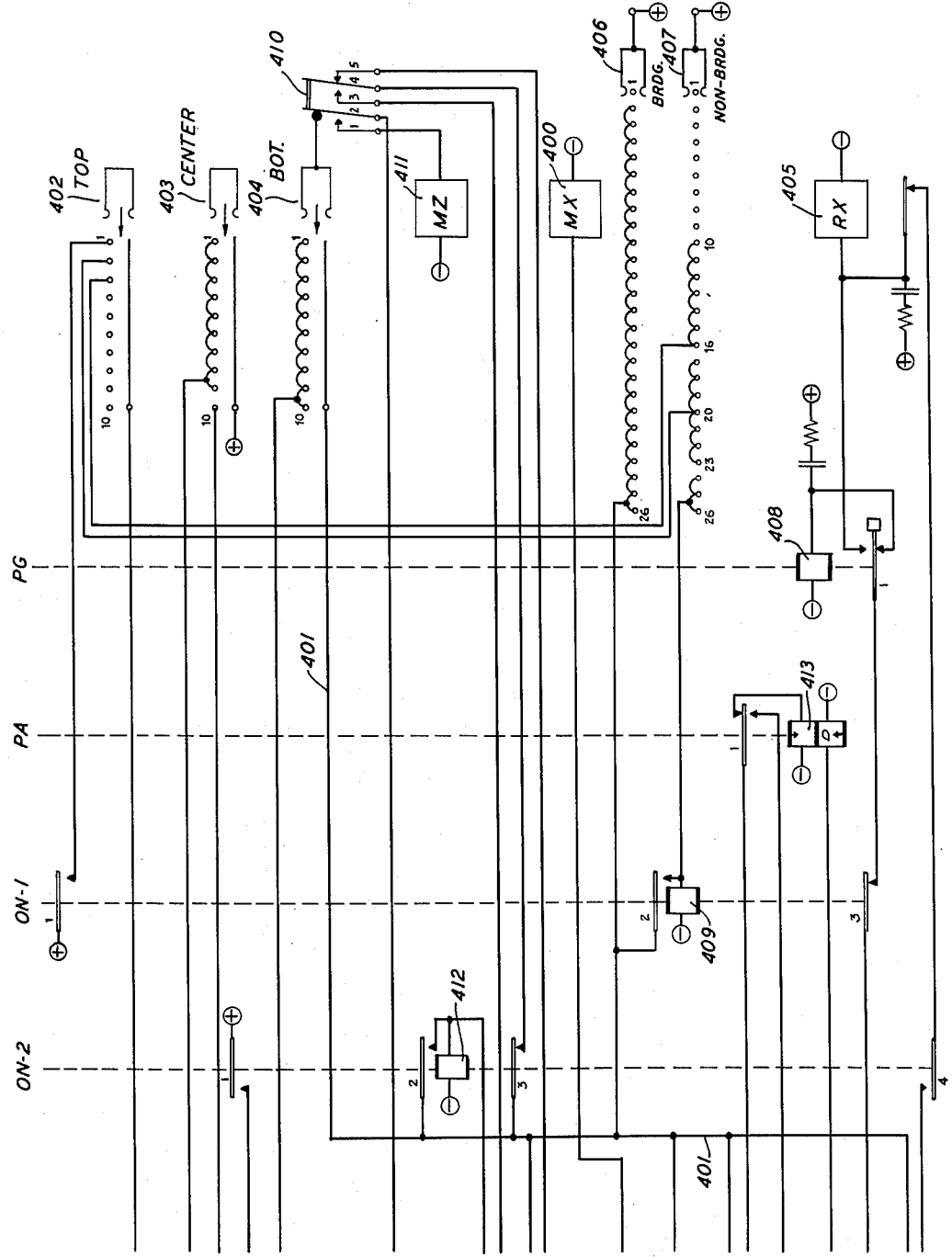

The drawings consist of three sheets having four figures, as follows:

Fig. 1 is a block diagram showing how Figs. 2, 3 and 4 may be placed to provide a complete schematic diagram of the circuits involved in the present invention;

Fig. 2 is a schematic circuit diagram of a substation including a dial, an indication of a line circuit, an allotter, a line finder and in some detail a conventional selector through which a test circuit may be reached, and Fig. 3 and Fig. 4 taken together form a complete circuit diagram of a test circuit which may be reached by the selector of Fig. 2 and which will respond to the substation dial to measure and report back the speed of operation thereof.

When a maintenance man visits the substation 200 on a routine inspection or in response to a trouble report, one of the operations he may wish to check is the speed of the substation dial 201. In accordance with the present invention there will be one or more test circuits, such as that shown in Figs. 3 and 4, provided at the central office and which the maintenance man may reach by dialing a given number known to him. He will accordingly make a call and by dialing this given number cause the selector switch of Fig. 2 to set its brushes on a set of terminals to which the test circuit of Figs. 3 and 4 is connected.

When he makes this call he establishes a calling bridge across the line, operates the conventional line circuit 202 and, by means of an allotter 203, causes the particular line finder 204 to make connection to the calling line. The ST start relay 205 therein is operated and when the calling line is reached the SW switch through relay 206 is operated to cause seizure of the coupled selector.

The calling bridge now operates the CB calling bridge relay 207 and this, in operating, causes the operation of the RD first slow relay 208 and the XD second slow relay 209. This latter relay connects the source of dial tone 210 to the calling line so that the subscriber or the maintenance man will know that the seelctor is now in condition to receive dial pulses. He thereupon operates the dial 201 to transmit a train of pulses corresponding to the designation of the test circuit.

It will be understood that in certain small offices where the first selectors may not have every level employed these test circuits may be connected to terminals of one of the idle levels. In more extensive systems where there are no spare levels then the test circuits may be connected to spare levels of second selectors. In any case, it will be at least necessary to operate the first selector to a given level.

The train of pulses transmitted by the dial 201 is in the form of a series of short breaks in the circuit of the calling bridge and the CB relay 207 responds to these breaks by momentarily releasing its armatures. The RD and XD relays, however, remain operated due to their slow releasing characteristics. The X magnet 210 responds to each pulse and drives the brushes a corresponding number of steps in the X direction to select the wanted "level." At the end of this train of pulses the HA relay 212 operates and by the interaction of the HA relay 212 and the Y magnet 211 the brushes are automatically driven over the terminals of busy lines until an idle line is found. The SW relay 213, normally shortcircuited by the grounded sleeves of the busy lines, now responds to an idle line and becomes operated in series with the HA relay 212 to seize the found idle line. Due to the comparatively high resistance of the SW relay 213 and the comparatively low resistance of the HA relay 212, this latter relay now fails to operate. The operation of the SW relay 213 clears out the CB relay 207 and the RD relay 208 and the latter, which supplied a ground connection for operating the SW relay 213 in series with the now released HA relay 212, releases after an interval determined by its slow releasing characteristics. However, before the RD relay 208 removes this ground, the circuit of Figs. 3 and 4 has been seized, the calling bridge relay therein has been operated, and a holding ground has been returned over the sleeve.

A clear metallic path is now provided to the test circuit of Figs. 3 and 4 and this circuit may be operated in the manner about to be described. When the test circuit is no longer needed, the connection may be released in conventional manner. The calling bridge is opened and in a short interval determined by the slow releasing characteristics of the first slow relay in the test circuit, the holding ground is removed from the sleeve. Thereupon the SW relay 213 is released and a circuit for the Z release magnet is established through the X-ON contacts 215 and the Y-ON contacts 216 whereby the selector is released and its brushes and relays are returned to normal.

When the testing circuit is seized the calling bridge of the substation will cause the operation of the calling bridge CB relay 300 in a circuit from ground, armature 1 and back contact of DT relay 301, upper winding of CB relay 300, tip terminal of the test circuit over the calling bridge provided at the substation, ring terminal of the test circuit and thence through the lower winding of the CB relay 300 to battery. The CB relay operates and closes an obvious circuit for the first slow releasing RD relay 302 and this relay performs a number of functions. First, it prepares a circuit for the SH-2 relay 303 so that this relay may operate as soon as the maintenance man dials into this circuit. Second, it grounds the sleeve wire to maintain the connection. Third, it closes a circuit through its armature 4 and front contact to prepare for the operation of the slow releasing SH-1 relay 304 and prepares a circuit for energizing the MX magnet 400 of the minor switch. Fourth, it grounds the monitor lamp 305 for the conventional purpose of indicating the busy condition of the circuit, and fifth, it extends the master ground wire 401 through armature 6 and front contact of this RD relay 302 to provide a locking means for the TT relay 306. The master ground wire 401 is not grounded at this time. The CB relay 300, besides operating the RD slow releasing relay, also closes a circuit through its armature 2 and front contact to operate the CB-1 relay 308.

It may be noted that the CB-1 relay 308 has but a single armature, whereas the RD slow releasing relay is heavily loaded. This actually allows the CB-1 relay to close a circuit from its armature 1 and front contact through armature 3 and back contact of the RD relay 302 to the upper winding of the DT relay 301 and in parallel therewith through the armature 5 and back contact of the RS relay 307 to charge the condenser 309. The application of ground to this front contact of armature 3 of the RD relay 302 is of very short duration and might not be sufficient to cause the operation of the DT relay, especially since this relay has its lower winding short circuited through the armature 8 and back contact of the RS relay 307. However, as the RD relay 302 operates and opens this direct path to the upper winding of the DT relay 301, the condenser 309 discharges through this winding and insures a momentary operation of the DT relay. During this momentary operation, dial tone from the source 310 is transmitted to the calling line as a signal that the wanted test circuit has been reached and is available for testing the substation dial.

The circuit now remains in this condition, with the CB relay 300, the CB-1 relay 308, and the RD relay 302, operated.

The maintenance man at the substation, in order to test the dial thereat, will now dial "0" which results in the transmission of a train of ten pulses. In general this will result in the movement of the top brush 402, the center brush 403, and the bottom brush 404 of the minor switch, ten steps. The rotary switch operated by the RX magnet 405 will move its brushes 406 and 407 a certain distance corresponding to the speed of the dial. A vibrating relay 408, provided with a weighted armature, is provided which may be adjusted to operate at a given speed. This is then so adjusted that the speed of operation is higher than the normal dialing rate so that during the dialing this rotary switch will move forwardly and then come to rest after the tenth dial pulse of the train has been transmitted. As shown in the drawings, the rotary switch may be arranged to move twice as fast as the normal dialing rate, that is, it should come to rest on its twentieth contact as the minor switch comes to rest on its tenth contact. The exact rate of speed of the rotary switch, however, is a matter of choice and may be altered to suit varying conditions.

As indicated in the drawings of a preferred embodiment of the invention, if the rotary switch comes to rest on any one of its contacts 10 to 16 inclusive, this will be taken to indicate that the substation dial was so fast in its operation that despite the high speed of the rotary switch it was only able to move this comparatively short distance. The movement of the brush 407 to the 10th to 16th contact therefore indicates fast operation of the dial.

If, on the other hand, the rotary switch reaches any one of its contacts 17 to 23 this will represent satisfactory operation of the dial, there being a considerable commercial tolerance allowed. Perfect operation of the dial would be indicated by the reaching of the contact 20 but the maintenance man would have no way of knowing more than that a satisfactory range had been reached. It is to be noted that the principle of the invention may be extended to provide even more precise information than that herein illustrated, by providing a larger number of indications.

If the dial is so slow in operation that it is considered unsatisfactory, then the rotary switch may reach its 24th contact where it will be stopped by the energization of the ON-1 relay 409 even though the SH-2 relay might have remained energized long enough to carry the brush 407 a considerable distance beyond. The result of the movement of the rotary switch as described will result in the transmission back to the substantion of a corresponding signal indicating fast, satisfactory, or slow operation of the dial. Thereafter the circuit will return to normal and the maintenance man by further operations of the dial may repeatedly cause the circuit to confirm its first report.

As the dialing takes place, the train of ten pulses will result in the periodic release of the CB relay 300. The RD relay holds over this period due to its slow releasing characteristics. Upon the first release of the CB relay 300, it will close an obvious circuit for the SH-2 relay 303 which will then lock itself to the ground provided immediately thereafter by the first movement of the brush 403 of the minor switch. The release of the CB relay 300 opens the circuit for the CB-1 relay 308 and this relay also releases to thereupon close a circuit through the armature 4 and front contact of the RD relay 302 to cause the energization of the SH-1 slow releasing relay 304 and the MX minor switch magnet 400. The SH-1 relay will hold over the train of pulses, but the MX magnet will respond to each. The brushes of the minor switch, therefore, are moved forwardly on each pulse of this train. As a result, the locking circuit for the SH-2 relay 303 is closed and the operation thereof is now steadily maintained during the transmission of the train of ten pulses to close and maintain a circuit from ground, armature 2 and front contact of the SH-2 relay 303, armature 3 and back contact of the ON-1 relay 409, armature 1 and back contact of the vibrating PG relay 408, winding thereof to battery. This relay, in operating, opens its own circuit and hence operates in the conventional manner as a buzzer. During each forward stroke of its tuned armature the PG relay 408 extends the ground for its operation to the RX rotary switch magnet 405, thus causing this switch to move forwardly. On the first step thereof the brush 406 will extend ground to the master ground wire 401.

It will also be noted that on the first step of the minor switch, the off normal contacts 410 will be operated.

On each pulse of the train the minor switch will be moved forwardly. On the tenth pulse, the holding circuit for the SH-2 relay 303 is opened so that as soon as the CB relay 300 operates again after this tenth pulse, the SH-2 relay 300 will release and stop the operation of the rotary switch. As the brush 403 reaches the tenth contact, a circuit is closed for the TT relay 306 and this relay locks through its front contact and armature 2, and the front contact and armature 6 of the RD relay 302 to ground on the master ground wire 401.

The operation of the TT relay 306 closes a circuit from ground on the master ground wire 401, through armature 6 and back contact of the RS relay 307, armature 4 and front contact of the TT relay 306, springs 2 and 1 of the off normal contacts 410 of the minor switch to the MZ release magnet 411 whereby the minor switch is released and its brushes are returned to normal.

On this return of the minor switch to normal, a circuit is established from ground on the master ground wire 401, armature 3 and back contact of the ON-2 relay 412, springs 4 and 5 of the minor switch off normal contacts 410, armature 3 and front contact of TT relay 306, lower winding of the RS relay 307 to battery. RS relay 307 operates and locks through its front contact and armature 4 to the ground on the master ground wire 401.

Now let us assume that the dial being tested was operating too fast and that, consequently, the brush 407 had only reached its contact number 12 by the time the ten pulses from the dial had been received and registered and the SH-2 relay 303 had been released to stop any further movement of this rotary switch. Thereupon the further automatic action will be as follows. Ground will be extended from the master ground wire 401, over armature 9 and front contact of RS relay 307, the lower winding of the PA relay 413 to battery. If at the instant that the RS relay 307 becomes operated a circuit from ground is actually closed through the interrupter 311, then this ground will be extended through armature 7 and front contact of the RS relay 307, armature 1 and back contact and the upper winding of the PA relay 413 to battery. The energization of the upper winding of the PA relay will oppose the energization of the lower winding thereof so that the PA relay will not operate at this time. However, as soon as the circuit of the upper winding is opened by the interrupter 311, the PA relay will respond. Upon the next closure of the circuit through the interrupter, the ground therefrom will be extended over armature 1 and front contact of PA relay 413, the upper winding of the DT relay 301 to battery. Since the RS relay 307 is operated at this time the lower winding of the DT relay 301 is no longer shortcircuited and this relay therefore has quick operating characteristics. The DT relay operates for the length of time measured by the interrupter 311 and during its energization transmits a spurt of tone to the calling subscriber by way of its armature 1 and steps the minor switch by way of its armature 2. The SH-1 slow releasing relay 304 is also operated to hold the minor switch MZ release magnet open until the signaling operation has been completed. In this manner the minor switch will be stepped three times and three spurts of tone will be transmitted to the calling subscriber. When the minor switch reaches its third contact, a circuit will be completed from ground, rotary switch brush 407 now assumed to be resting on its number 12 contact, the third contact of the minor switch brush 402, armature 1 and front contact of the TT relay 306, armature 1 and front contact of the RS relay 307 and thence through the upper winding thereof to battery. The RS relay is differentially wound and hence this energization of its upper winding will oppose the energization of its lower winding and the relay will release. Thereupon the PA relay 413 will be released and the MZ minor switch release magnet 411 will be energized to return this switch to normal.

It is also to be noted that upon the first step of the minor switch in this signal transmitting operation, a circuit is established from ground on the master ground wire 401, armature 3 and back contact of the ON-2 relay 412, springs 4 and 3 of the minor switch, off normal switch 410, armature 3 and front contact of the RS relay 307, winding of ON-2 relay 412 to battery, so that this relay operates and locks through its front contact and armature 2 directly to the master ground wire 401. Thus, as soon as the RS relay 307 releases, the master ground wire is extended through armature 9 and back contact of the RS relay 307, the interrupter contact and winding of the RX rotary stepping magnet 405 of the rotary switch. The rotary switch now steps until the brush 406 reaches normal, whereupon this circuit is opened and this action comes to a halt. It may also be noted that the minor switch cannot be started again as it reaches its normal position due to the operation of the ON-2 relay 412.

The circuit is now in the condition reached after it has been seized, and may again be operated in the manner described so that the subscriber or the maintenance man may seek a confirmation of the first signal. Presumably this will be the same, but there may be occasions where the brush 407 will reach its sixteenth contact on several operations and its seventeenth contact one or more times. If, under repeated operation of the circuit, the maintenance man is able to hear three spurts of tone (contact 16) a number of times and one or more signals of but two spurts of tone (contact 17), then he will know that the dial, while overfast in its operation, is still almost within the range of satisfactory. Such operation is possible, though with perfect adjustment of all components, is not probable.

When the maintenance man is satisfied with the testing, he will hang up and release the CB calling bridge relay 300. Thereupon the CB-1 relay 308 will release and in due time the RD relay 302 will release. If the MX magnet 400 and the RX magnet 405 have succeeded in moving the two switches off normal before the RD relay releases, then the rotary switch will ground the master ground wire 401 to drive the rotary switch to normal and ground on armature 5, and back contact of the RD relay 302 will serve to release the minor switch.

In the same manner as hereinabove described, two spurts of tone will be transmitted to the calling substation if the rotary switch has reached any one of its contacts 17 to 23 and but a single spurt of tone if the rotary switch has reached its contact 24. In this latter case the rotary switch is stopped on its contact 24 and the ON-1 relay 409 is operated to supply a ground connection to the brush 402 of the minor switch, even though the release of the SH–2 relay 303 may have been delayed until the rotary switch could have reached a contact beyond that numbered 26.

If, through any faulty operation, the minor switch fails to reach its tenth contact on the dialing operation, as when for instance the maintenance man dials 9 or some other lower number, the TT relay will not become operated and the SH–2 relay will not be released. In a short interval after this lower number train of impulses has terminated, as measured by the slow releasing characteristics of the SH–1 relay 304, this relay will return to normal and will extend a circuit from ground on the master ground wire 401, through the brush 404, back contact and armature 2 of the RS relay 307, back contact and armature 2 of the SH–1 relay 304, springs 2 and 1 of the minor switch, off normal switch 410 to the winding of the MZ release magnet 411 so that the minor switch is released. The release of the SH–1 relay 304 also closes a circuit from ground on the master ground wire 401, armature 6 and back contact of RS relay 307, armature 4 and back contact of the TT relay 306, armature 3 and back contact of the SH–1 relay 304 and the winding of the ON–2 relay 412 to battery and this relay operates and locks through its front contact and armature 2 to the master ground wire 401. The ON–2 relay closes an alternate circuit from ground on the master ground wire 401, armature 9 and back contact of the RS relay 307, front contact and armature 4 of the ON–2 relay 412, thence through the interrupter contacts and the winding of the RX magnet 405 so that the rotary switch will move automatically until the ON–2 relay 412 releases by virtue of the brush 406 reaching its number 1 contact where the ground is removed from the master ground wire. As the minor switch releases the locking circuit for the SH–2 relay is opened by the brush 403 and this relay releases. The RS relay 307 is not operated since the TT relay 306 is not operated and since the SH–2 relay releases the alternate driving circuit for the RX magnet is made good, as above described. Since the RS relay does not operate the DT relay 301 cannot be operated so that dial tone is not returned to the calling station.

Thus a means is provided whereby a subscriber or a maintenance man may selectively appropriate a test circuit and by dialing "0" into this circuit may receive an answer back signal indicating that the dial is slow, satisfactory, or fast in its operation.

What is claimed is:

1. In a signaling system, a station including a signal transmitter, a signal responsive circuit, means responsive to said signal transmitter for selectively establishing a connection to said signal responsive circuit, means in said circuit for transmitting signals over said established connection to said station, means responsive to the seizure of said signal responsive circuit for operating said transmitting means in said circuit, a pair of stepping switches in said circuit, one of said switches being responsive to signals from said station signal transmitter, means for driving the other of said switches automatically at a uniform rate, means responsive to said station signal transmitter for starting and for stopping said driving means, means for thereafter automatically driving said first one of said switches and means jointly controlled by said stepping switch during said automatic movement of said first switch for operating said transmitting means in said circuit differently for different positions of said other switch.

2. In a signaling system, a station including a signal transmitter, a signal responsive circuit, means for connecting said station with said circuit, means in said circuit for transmitting signals to said station, a minor stepping switch having a stepping magnet responsive to signals from said station signal transmitter, a rotary stepping switch, means for driving said rotary switch at a uniform rate during the stepping operation of said minor switch, said switches being in and a part of said signal responsive circuit, different connections controlled by said rotary stepping switch in different stopping positions thereof, means controlled by said different connections for enabling said signal transmitting means in said circuit and means controlled by said minor switch in a particular position thereof for enabling said last means.

3. In a signaling system, a station including a signal transmitter, a signal responsive circuit, means for connecting said station with said circuit, means in said circuit for transmitting signals to said station, a minor stepping switch having a stepping magnet responsive to signals from said station signal transmitter, a rotary stepping switch, means for driving said rotary switch at a uniform rate during the stepping operation of said minor switch, said switches being in and a part of said signal responsive circuit, different connections controlled by said rotary stepping switch in different stopping positions thereof, means controlled by said different connections for enabling said signal transmitting means in said circuit and means controlled by said minor switch when set on its tenth contact in response to a train of ten pulses from said station signal transmitter for enabling said last means.

4. In a signaling system, a station including a signal transmitter, a signal responsive circuit, means for connecting said station with said circuit, means in said circuit for transmitting signals to said station, means in said circuit responsive to signals transmitted from said station signal transmitter consisting of a first stepping switch responsive to the number of pulses in a train of pulses transmitted by said station signal transmitter and a second stepping switch responsive to the duration of said signal consisting of said train of pulses, said second switch having a first group of contacts reached by said switch when the duration of said train of pulses is below normal, a second group of contacts reached by said switch when the duration of said train of pulses is normal, and a third group of contacts reached by said switch when the duration of said train of pulses is above normal, connections from said groups of contacts for enabling in different manner said means in said circuit for transmitting signals to said station and means responsive to the reaching of the first of said third group of contacts by said second switch for stopping further stepping thereof prior to the termination of said time duration of said train of pulses.

5. In a signaling system, a station including a signal transmitter, a signal responsive circuit, means for connecting said station with said circuit, means in said circuit for transmitting signals to said station, a stepping switch having a stepping magnet responsive to signals from said station signal transmitter and a release magnet responsive in one instance to the reaching of a particular terminal under said station signal transmitter operation for restoring said switch to normal, a rotary stepping switch, means for driving said rotary switch at a uniform rate during the stepping operation of said first switch, said switches being in and a part of said signal responsive circuit, different connections controlled by said rotary stepping switch in different stopping positions thereof, said connections extending to contacts of said first stepping switch, means responsive to said restoration of said first stepping switch after said rotary switch has been driven to its said stopping position for causing said first stepping switch to operate automatically to scan said different connections from said rotary switch and means controlled by said first stepping switch during its said automatic movement and responsive to conditions established on said different connections by said rotary stepping switch for enabling said signal transmitting means in said circuit.

References Cited in the file of this patent
UNITED STATES PATENTS

| | | |
|---|---|---|
| 1,784,612 | Preist | Dec. 9, 1930 |
| 2,489,282 | From | Nov. 29, 1949 |